June 25, 1940. C. A. NICHOLS 2,205,821
METHOD AND APPARATUS FOR FORMING MULTIPLY TUBING
Filed April 2, 1938 9 Sheets-Sheet 3

INVENTOR
Charles A. Nichols
BY
Spencer Hardman & Feln
his ATTORNEYs

June 25, 1940.  C. A. NICHOLS  2,205,821

METHOD AND APPARATUS FOR FORMING MULTIPLY TUBING

Filed April 2, 1938  9 Sheets-Sheet 7

INVENTOR
Charles A. Nichols
BY
Spencer Hardman & Fehr
his ATTORNEYs

Patented June 25, 1940

2,205,821

UNITED STATES PATENT OFFICE 2,205,821

METHOD AND APPARATUS FOR FORMING MULTIPLY TUBING

Charles A. Nichols, Anderson, Ind., assignor to General Motors Corporation, Detroit, Mich., a corporation of Delaware Application April 2, 1938, Serial No. 199,557

18 Claims. (Cl. 113—33)

This invention relates to improvements in the manufacture of multiply tubing made by forming a plurality of flat strips of steel into concentric cylindrical plies with the seams of the plies disposed a substantial distance apart. The tubing is completed by passing it through a bath of molten brazing metal which penetrates the interstices between the seams and plies to bond the seams and plies together.

It is a primary aim and object of the present invention to provide a novel tube forming method and apparatus by which the formation of multiply tubing may be carried on continuously and at a relatively great speed of travel of the tube stock. This object is accomplished by forming overlapping strips of steel stock into multiply tubular shape approximately the shape of the finished product and then by swaging the approximately formed plies of tubing into the desired shape with the plies substantially cylindrical and concentric and closely compacted together with their seams substantially closed. More specifically the overlapping portions of the strips are simultaneously formed into semi-cylindrical or half tubular portions of the completed plies. Then the inner ply is formed into approximately cylindrical formation and then the outer ply is formed around the inner ply into approximately cylindrical formation. Then follows the swaging operation referred to. The formation of the overlapping strips into approximate multiply tubular formation is effected by series of rolls and guides which are relatively simple in construction and relatively few in number owing to the fact that these rolls and guides are required to give to the tubing its approximate formation, whereas a rotary swager is employed to hammer the tubing into a compact multiply cylindrical formation.

This application is a continuation in part of my copending application Serial No. 109,344, filed November 5, 1936.

Further objects and advantages of the present invention will be apparent from the following description, reference being had to the accompanying drawings wherein, a preferred embodiment of the present invention is clearly shown.

In the drawings:

In Fig. 1B, the sectional view of guide A is taken on the line IB—IB of Fig. 3A on Sheet 1.

Fig. 3C on Sheet 2 is a sectional view of guide A on line 3C—3C of Fig. 1B.

Fig. 4 is a sectional view on the line 4—4 of Fig. 1B.

Fig. 5 is a sectional view on the line 5—5 of Fig. 1B.

Fig. 6 is a sectional view on the line 6—6 of Fig. 1B.

Fig. 7 is a sectional view on the line 7—7 of Fig. 1B.

Fig. 12 is a sectional view on the line 12—12 of Fig. 1C.

Fig. 13 is a sectional view on the line 13—13 of Fig. 1C.

Fig. 14 is a sectional view on the line 14—14 of Fig. 1C.

Fig. 15 is a sectional view on the line 15—15 of Fig. 1C.

Fig. 16 is an enlarged sectional view of the strips of stock resulting from formation at section 10—10 of Fig. 1C.

Fig. 17 is an enlarged sectional view of the strips of stock resulting from formation at section 12—12 of Fig. 1C.

Fig. 18 is an enlarged sectional view of the strips of stock resulting from formation at section 14—14 of Fig. 1C.

Fig. 19 on Sheet 4 is a sectional view on the line 19—19 of Fig. 1D.

Fig. 20 is a sectional view on the line 20—20 of Fig. 1D.

Fig. 21 is a sectional view on the line 21—21 of Fig. 1D.

Fig. 22 is a sectional view on the line 22—22 of Fig. 1D.

Fig. 23 is an enlarged sectional view of the strips of stock resulting from formation at section 19—19 of Fig. 1D.

Fig. 24 is an enlarged sectional view of the strips of stock resulting from formation at section 21—21 of Fig. 1D.

Fig. 25 on Sheet 5 is a sectional view on the line 25—25 of Fig. 1E.

Fig. 26 is a sectional view on the line 26—26 of Fig. 1E.

Fig. 27 is a sectional view on the line 27—27 of Fig. 1E.

Fig. 28 is a sectional view on the line 28—28 of Fig. 1E.

Fig. 29 is an enlarged sectional view of the strips of stock resulting from formation at section 25—25 of Fig. 1E.

Fig. 30 is an enlarged sectional view of the strips of stock resulting from formation at section 27—27 of Fig. 1E.

Fig. 31 is an enlarged sectional view of the strips of stock resulting from formation at section 28—28 of Fig. 1E.

Fig. 32 on Sheet 6 is a sectional view on the same scale as Fig. 31 of the stock after having been operated upon by the rotary swager shown in the other views on Sheet 6.

Figs. 77 and 78 are end and fragmentary side views, respectively, of the spindle of the rotary swager shown in Figs. 33 and 34 on Sheet 6.

Figs. 79 and 80 are end and longitudinal sectional views, respectively, of one of the swaging blocks, these views being drawn approximately twice the scale of Figs. 77 and 78.

Figures 1A, 2A, 3A, 3B:
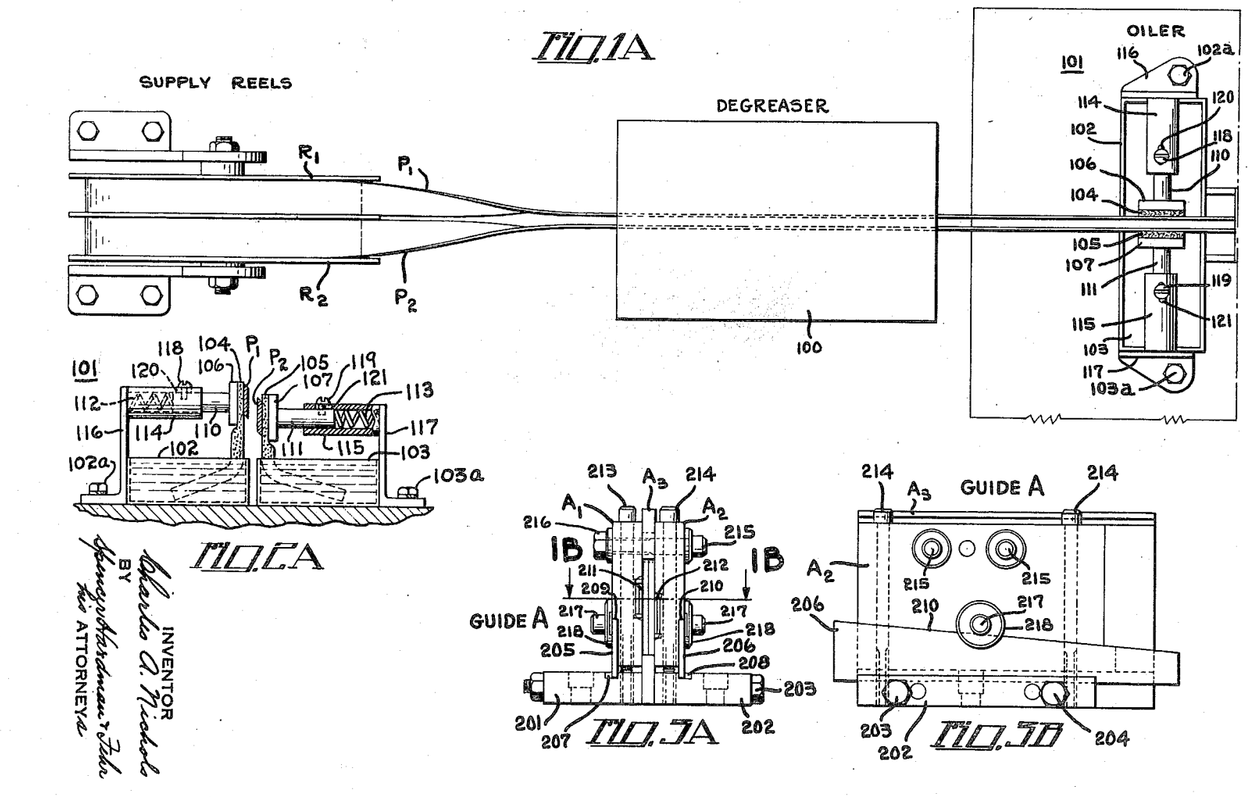
Fig. 1A on Sheet 1, Fig. 1B on Sheet 2, Fig. 1C on Sheet 3, Fig. 1D on Sheet 4 and Fig. 1E on Sheet 5 taken together constitute a plan view of a tube forming mill embodying the present invention.
Fig. 2A on Sheet 1 is an end elevation of the strip oiler shown in Fig. 1A on Sheet 1.
Figs. 3A and 3B on Sheet 1 are end and side views respectively of guide A.
Figures 1B, 3C, 4, 5, 6, 7, 8, 9:
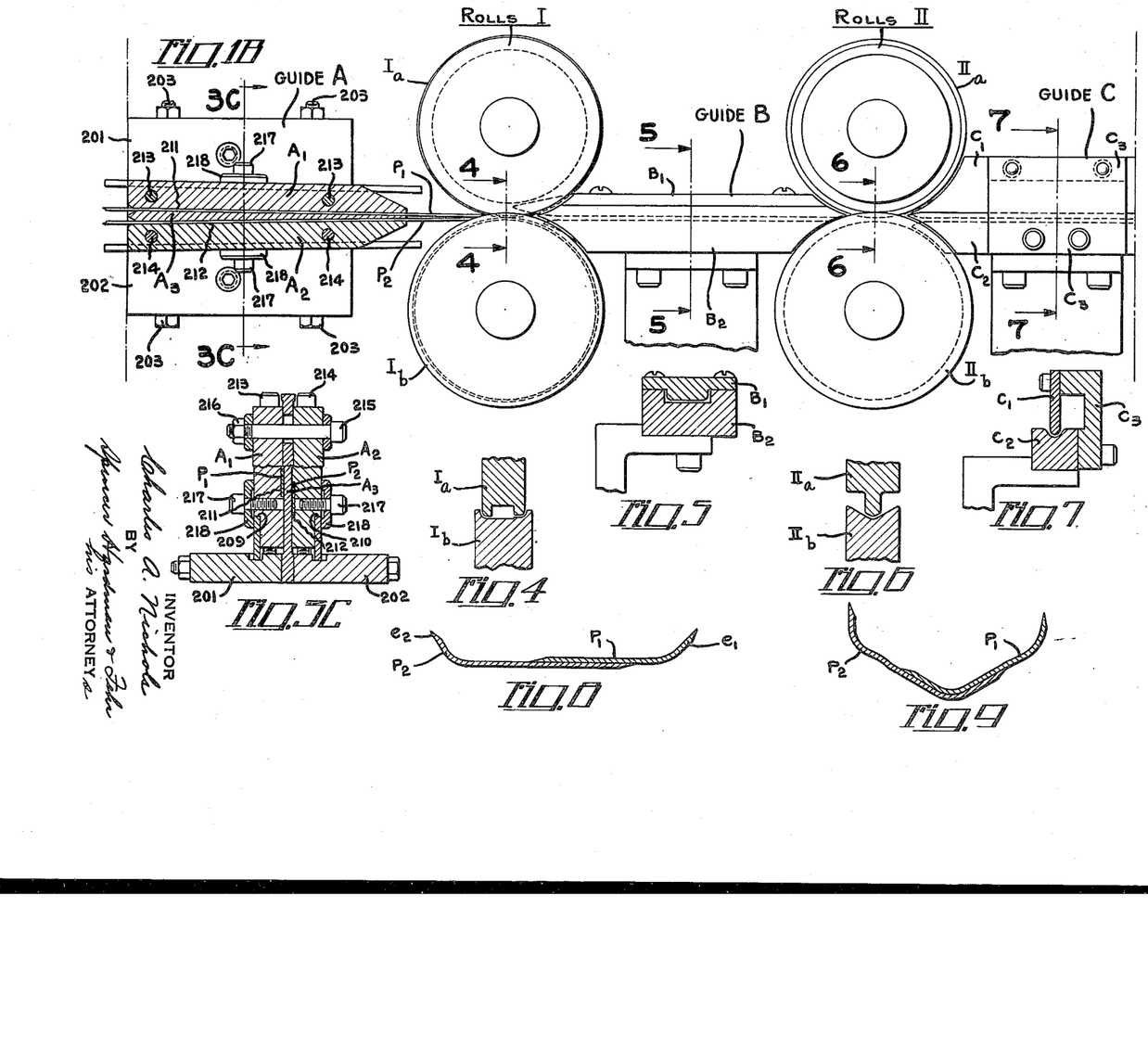

The multiply tubing lettered T in Fig. 32, Sheet 6, comprises an inner ply $P_1$ and an outer ply $P_2$ having their edges bevelled or scarfed at 20° angle as shown in Fig. 8, Sheet 2. For ¼" O. D. tubing the plies of steel are .013" to .015" thick. Before scarfing, the inner ply is .660" to .665" wide and scarfs to .678" to .684" wide; and, before scarfing, the outer ply is .767" to .772" wide and scarfs .785" to .790" wide. The plies are scarfed by means of scarfing rollers designed to produce the required bevel. The ply strips $P_1$ and $P_2$ are supplied from reels $R_1$ and $R_2$ (Fig. 1A, Sheet 1) respectively, from which they are unwound by the operation of the tube forming apparatus. The plies pass first through a degreaser 100 which removes all of the oil previously placed upon the strip steel to protect it from rust. The degreaser is a rectangular box containing a cleaning liquid which is heated to produce a vapor which thoroughly cleanses the strips.

The cleansed plies $P_1$ and $P_2$ then pass to the oiler 101 which applies oil to the inner surface of the inner ply $P_1$ and to the outer surface of the outer ply $P_2$, but not to adjacent surfaces of the two plies. Lubrication of the plies is necessary in order to reduce friction and prevent galling of the arbor or mandrel and rolls of the forming apparatus by the plies of steel passing through. If the oil on the plies is excessive, the tubing will become carburized in the brazing furnace in which the tubing is subjected to the bath of molten brazing metal. Therefore, a close control of the amount of oil on the plies is imperative. To control the amount of oil, the plies are first passed through a degreaser to remove all of the oil previously on the plies and a wick type oiler is used to apply the correct amount of oil of known composition. Any light oil free of sulphur, such as commercial "ceresinol," would be satisfactory.

The oiler 101 comprises oil vessels 102 and 103 for containing oil absorbed by wicks 104 and 105 respectively urged by plunger pads 106 and 107 against the remote sides of plies $P_1$ and $P_2$ respectively. Pad 106 is mounted on a plunger 110 urged by a spring 112 toward ply $P_1$; and pad 107 is mounted on a plunger 111 urged by a spring 113 toward the ply $P_2$. The plunger 110 and spring 112 are supported by a guide table 114 mounted on a bracket 116. A screw or pin 118 passes through a slot 120 in the tube 114 and is attached to the plunger 110 in order to prevent rotation of the pad 106 and to limit movement of pad 106 toward ply $P_1$. Likewise, plunger 111 and spring 113 are supported by a tube 115 carried by a bracket 117. A pin 119 passes through a slot 121 and tube 115 and is fixed to the plunger 111 in order to prevent rotation of the pad 107 and to limit movement of pad 107 toward ply $P_2$. Vessels 102 and 103 are hingedly attached to the rolling machine by screws 102a and 103a to permit swinging the oilers away from stock guide A while threading new stock into the rolling machine. The wicks absorb a limited supply of oil from the vessels 102 and 103 and apply only a very thin film of oil to the plies $P_1$ and $P_2$. The amount of oil supplied is sufficient for the lubrication of material as it passes through the forming apparatus and a slight amount of oil will remain on the inside of the tubing as it enters the brazing furnace. This oil forms a gas in the brazing furnace which combines with the oxygen inside the tubing and prevents oxidation of the inside of the tubing. The exterior of the tubing is protected while passing through the brazing furnace by introducing into the furnace a supply of reducing gas.

The adjacent surfaces of the plies $P_1$ and $P_2$ should be free from oil, since no useful purpose is served by applying oil to these surfaces. The amount of oil taken by the tubing into the brazing furnace should be as small as possible in order to eliminate the carburizing effect of this oil. Therefore, the oiler is constructed so as not to place any oil between the plies.

As shown in Figs. 1B, 1C, 1D and 1E the rolling machine comprises guides A, B, C, D, E, F, G, H and J and sets of rolls numbered with Roman numerals from I to X. The rolls are driven by vertical shafts which are so geared together and to a source of power that the peripheral speed of the surfaces of the rollers engaging the stock is substantially the same. For the manufacture of ¼" O. D. tubing, a speed of 18 ft. per. min. has been found satisfactory. All of the guides and rolls are made of chromium plated hardened steel.

Guide A on Sheet 2 comprises plates $A_1$ and $A_2$ and an intermediate plate $A_3$ which maintain the plies $P_1$ and $P_2$ in the relation shown in Fig. 3C with the predetermined amount of overlap. Plate $A_1$ has a groove 211 which guides the ply $P_1$. Plate $A_2$ has a groove 212 which guides the ply $P_2$. The lower portion of plate $A_3$ is clamped between two base plates 201 and 202 secured by through bolts 203 and 204. Plates $A_1$ and $A_2$ are vertically adjustable along plate $A_3$. The positions of plates $A_1$ and $A_2$ are determined by wedges 205 and 206, respectively. The lower edges of wedges 205 and 206 are received, respectively, by grooves 207 and 208 provided by plates 201 and 202, respectively. Wedges 205 and 206 cooperate, respectively, with shoulders 209 and 210, respectively, of plates $A_1$ and $A_2$, respectively. Shoulders 209 and 210 are inclined to the horizontal as shown in Fig. 3B. These wedges having been so located that the guiding grooves 211 and 212 of plates $A_1$ and $A_2$ are positioned to give the plies $P_1$ and $P_2$ the correct amount of overlap, plates $A_1$ and $A_2$ are secured in the required position of adjustment by tightening screws 213 and 214 which pass vertically through these plates and are threaded into holes tapped into base plates 201 and 202, respectively. Plates $A_1$ and $A_2$ are secured in the required position also by clamping bolts 215 which pass through round holes in plates $A_1$ and $A_2$ and through vertical slots in plate $A_3$ and which cooperate with nuts 216. Wedges 209 and 210 are secured in position also by screws 217 passing through washers 218 and threaded into tapped holes in plates $A_1$ and $A_2$.

The first set of rolls I, comprising rolls $I_a$ and $I_b$, receives the plies from guide A and rolls a curve on the outside edge of each ply thereby producing work having a cross-section as shown in Fig. 8. The work then passes through guide B comprising members $B_1$ and $B_2$ which cooperate to provide a channel-shaped passage through which the work, as shown in Fig. 8, passes. The turned-up edges $e_1$ and $e_2$ of Plies $P_1$ and $P_2$, respectively, cooperate with the side walls of this channel to hold the plies in correct relation without changing the overlap while the plies move to the next set of rolls II. The details of guide parts $B_1$ and $B_2$ are shown in Figs. 36 to 41 on Sheet 7.

Rolls II, comprising roll $II_a$ and roll $II_b$, start forming on the center of the work curving it up to an angle of about 120°, as shown in Fig. 9 which is drawn to a larger scale than Fig. 6. The plies $P_1$ and $P_2$ are so off set that this 120° bend is located about one-quarter of the way in from the edges of the plies. The plies are maintained substantially in the position shown in Fig. 9 while they pass through the guide C comprising members $C_1$, $C_2$ and $C_3$. The space between the members $C_1$ and $C_2$ which is arcuate in cross-sectional contour receives the overlapping 120° bent portions of the plies $P_1$ and $P_2$ and prevents lateral displacement. The details of guide parts $C_3$, $C_1$ and $C_2$ are shown in Figs. 42 to 48 on Sheet 7.

Figures 1C, 10, 11, 12, 13, 14, 15, 16, 17, 18:
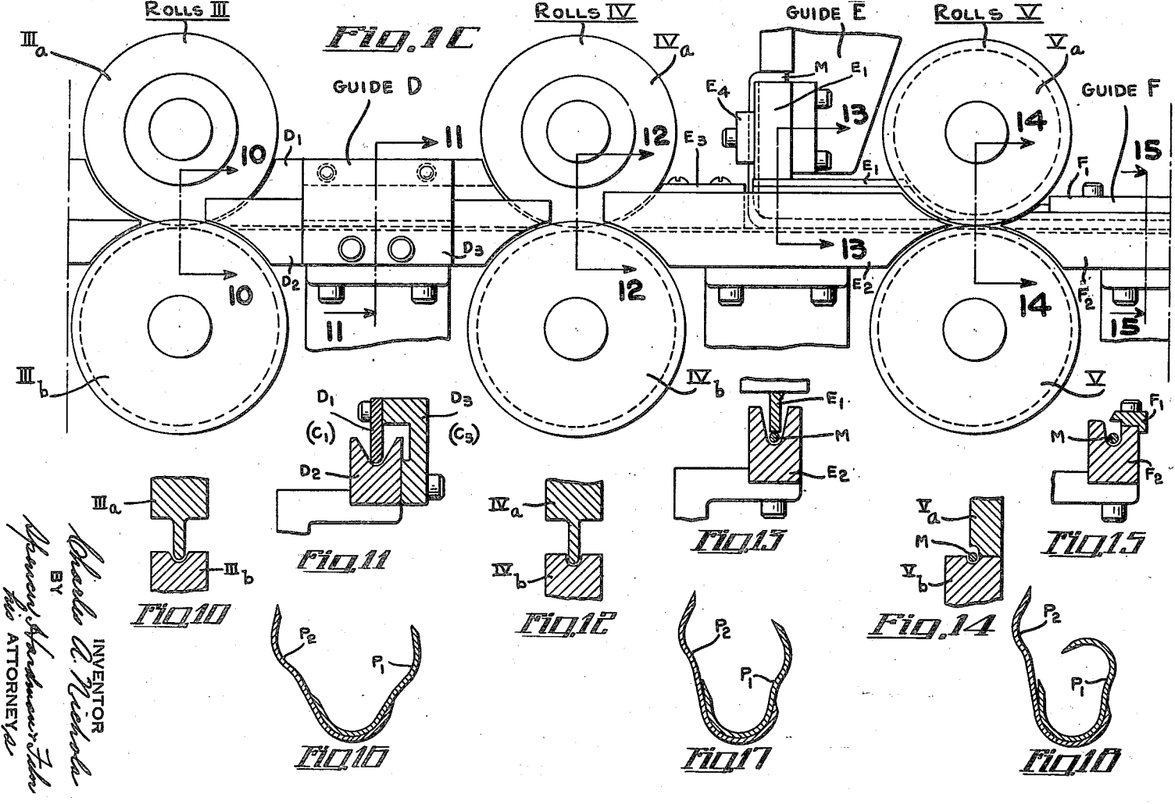
Figure 49:
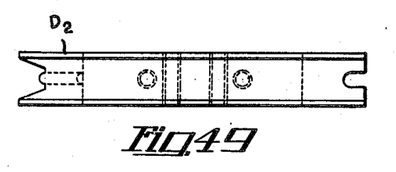
Figs. 49, 50 and 51 are side, top and end views, respectively, of part $D_2$ of guide D on Fig. 1C on Sheet 3.
Figure 50:
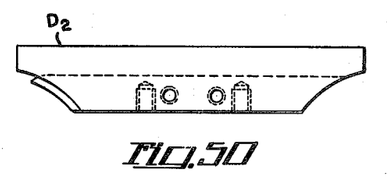
Figure 51:
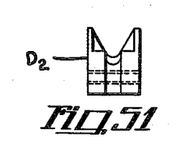

Rolls III which comprise rolls $III_a$ and $III_b$ form the work into the shape shown in Fig. 16 in which the sides thereof appear to make an angle approximately 60°, which is a sort of V-shaped formation. The work then passes through guide D which comprises parts $D_1$, $D_2$ and $D_3$. Part $D_1$ is the same as part $C_1$ of guide C, and part $D_3$ is the same as part $C_3$ of guide C. The space between guide parts $D_1$ and $D_2$ is arcuate in cross-section and receives the bent overlapping portions of the plies. The part $D_2$ provides a V-shaped channel, the sides of which are approximately 60°. The details of part $D_2$ are shown in Figs. 49 to 51 on Sheet 7.

Figure 52:
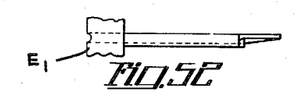
Figs. 52, 53 and 54 on Sheet 8 are side, plan and end views, respectively, of part $E_1$ of guide E on Fig. 1C.
Figure 53:
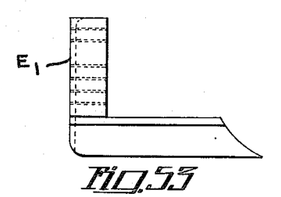
Figure 54:
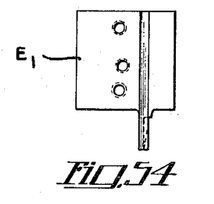
Figure 55:
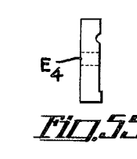
Figs. 55 and 56 are edge and side views, respectively, of part $E_4$ of guide E.
Figure 56:
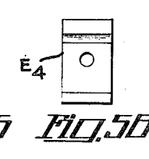
Figure 57:
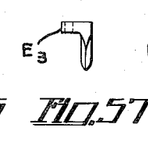
Figs. 57 and 58 are edge and plan views, respectively, of part $E_3$ of guide E.
Figure 58:
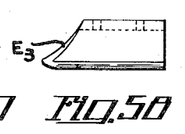
Figure 59:
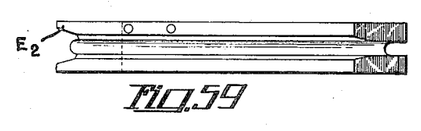
Figs. 59, 60 and 61 are side, plan and end views, respectively, of part $E_2$ of guide E.
Figure 60:
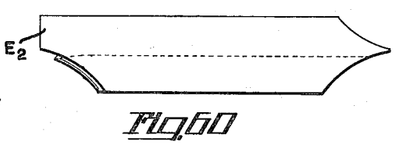
Figure 61:
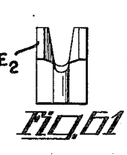

From guide D the work passes through rolls IV comprising rolls $IV_a$ and $IV_b$ which form the work into the shape shown in Fig. 17 in which the work is formed into as nearly a U-shape as is possible. Then the work passes through guide E comprising part $E_1$ (for details see Figs. 52, 53 and 54, Sheet 8), part $E_2$ (for details see Figs. 59, 60 and 61), part $E_3$ (for details see Figs. 57 and 58) and an arbor or mandrel M which is attached to guide part $E_1$ by the part $E_4$, (for details see Figs. 55 and 56). The mandrel M projects into a space between the adjacent ends of guide parts $E_1$ and $E_3$ and then is bent at right angles and extends through a deep V-shaped channel in the guide part $E_2$ as shown in Fig. 13. Mandrel M extends through all of the subsequent rolls and guides and into the rotary swager shown in Fig. 33.

Figures 62, 63, 64:
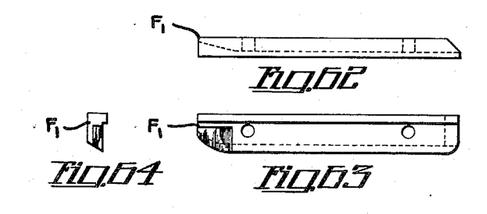
Figs. 62, 63 and 64 are plan, side and end views, respectively, of part $F_1$ of guide F on Fig. 1C.
Figure 65:
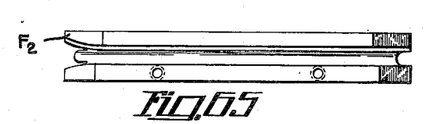
Figs. 65, 66 and 67 are side, plan and end views, respectively, of part $F_2$ of guide F.
Figure 66:
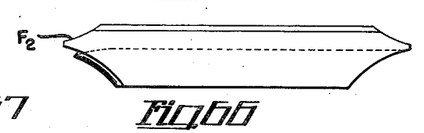
Figure 67:
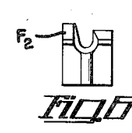
Figure 68:
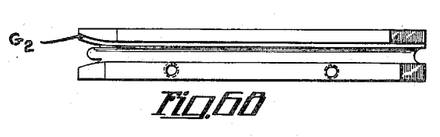
Figs. 68, 69 and 70 are side, plan and end views, respectively, of part $G_2$ of guide G in Fig. 1D on Sheet 4.
Figure 69:
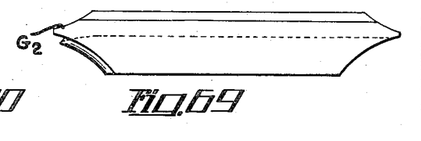
Figure 70:
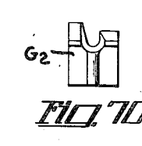

Up to the point where the work enters between the rolls V, as substantially shown in Fig. 17, the previously described rolls and guides have caused the work to be shaped so that the overlapping portions of the plies have been formed simultaneously into approximately one-half cylindrical portions. Between rolls V, comprising rollers $V_a$ and $V_b$, the completion of the formation of the inner ply $P_1$ is begun. The rolls V change the shape from that shown in Fig. 17 to that shown in Fig. 18. Then the work passes through guide F comprising part $F_1$ (for details see Figs. 62, 63 and 64, Sheet 8) and part $F_2$ (for details see Figs. 65, 66 and 67). The mandrel M which occupies a position near the bottom of the groove in part $F_2$ tends to maintain the one-half cylindrical portions of the plies in correct relation while the non-overlapping portion of the ply $P_1$ is being formed. After the work passes through guide F, it passes through rolls VI comprising $VI_a$ and $VI_b$, which shape the work substantially into the form shown in Fig. 23. Then the work passes through guide G comprising a part $G_1$ which is the same as part $F_1$ of guide F and a part $G_2$ (for details see Figs. 68, 69 and 70, Sheet 8). Then the work passes through rolls VII, comprising $VII_a$ and $VII_b$, which form the work into the shape shown in Fig. 24. The inner ply $P_1$ has been formed very roughly into tubular formation while the formation of the outer ply $P_2$ remains uncompleted.

Figures 71, 72, 73:
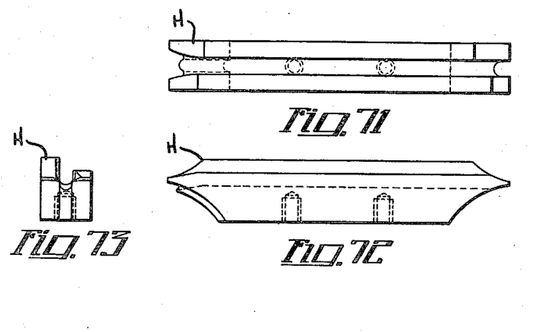
Figs. 71, 72 and 73 on Sheet 9 are side, plan and end views, respectively, of guide H on Fig. 1D.

Next, the work passes through guide H, the details of which are shown in Figs. 71, 72 and 73, Sheet 9. Guide H cooperates with the mandrel M to guide the work to rolls VIII, which include $VIII_a$ and $VIII_b$, which change the shape of the outer ply $P_2$ from that shown in Fig. 24 to that shown in Fig. 29.

Figures 1E, 25, 26, 27, 28, 29, 30, 31:
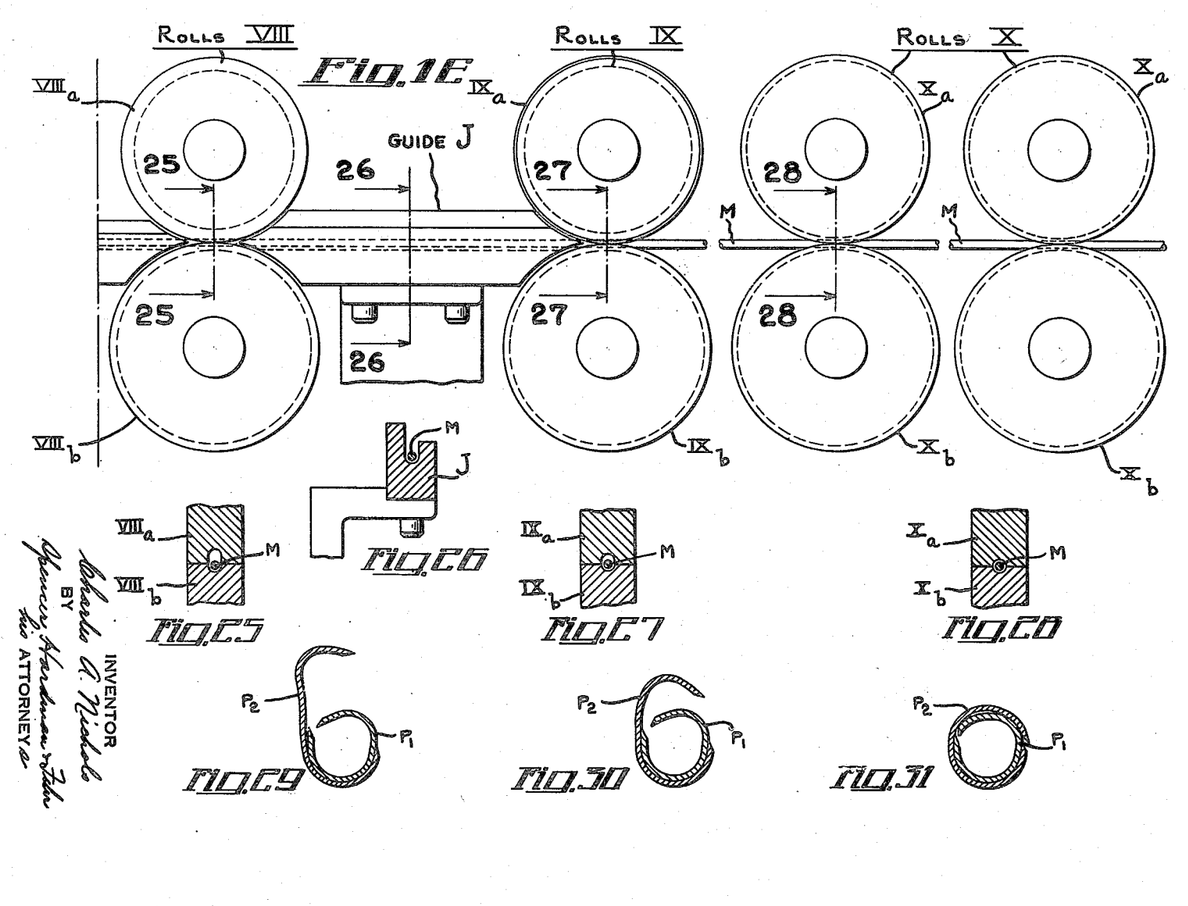
Figure 8:
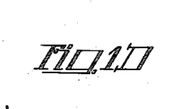
Fig. 8 is an enlarged sectional view of overlapping strips of stock resulting from formation at section 4—4 of Fig. 1B.
Figures 9, 10, 11:
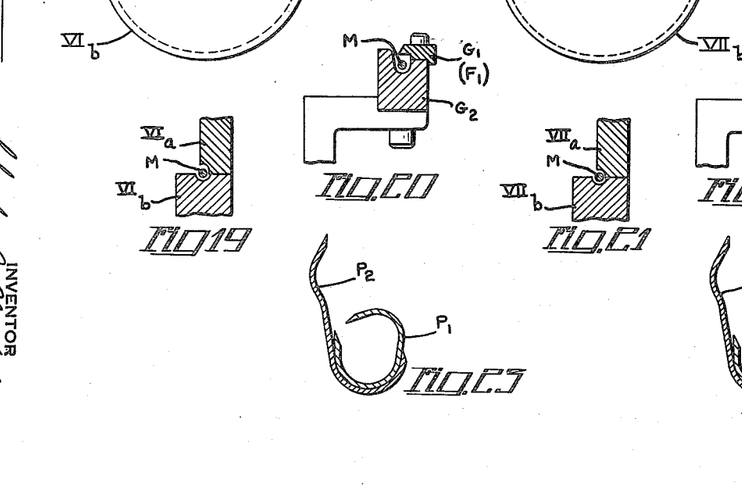
Fig. 9 is an enlarged sectional view of overlapping strips of stock resulting from formation at section 6—6 of Fig. 1B.
Fig. 10 on Sheet 3 is a sectional view on the line 10—10 of Fig. 1C.
Fig. 11 is a sectional view on the line 11—11 of Fig. 1C.
Figures 74, 75, 76:
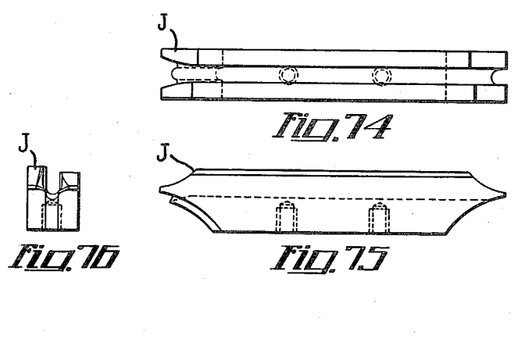
Figs. 74, 75 and 76 are side, plan and end views, respectively, of guide J on Fig. 1E on Sheet 5.

The work then passes through guide J (for details see Figs. 74, 75 and 76 on Sheet 9) and then between rolls IX, comprising $IX_a$ and $IX_b$, where the work is shaped into the form shown in Fig. 30. Then the work passes between rolls X, comprising two pairs of rolls like $X_a$ and $X_b$. The first pair of rolls $X_a$ and $X_b$ shape the work into the form shown in Fig. 31, which shows that the inner plies have been formed only approximately into cylindrical formation and that the plies have not been compacted together so that the space between them is at the minimum, and that the edges of the inner plies are abutting and the bevelled edges of the outer plies are completely overlapping. The second pair of rolls Xa and Xb are used to assist in pulling the work through the machine since no rolls after rolls IV have any definite traction on the tubing.

The sets of rolls VIII, IX and X form the outer strip from the shape shown in Fig. 18 to that shown in Fig. 31 and also change the shape of the inner ply slightly. Rolls X should round up the tubing as perfectly as it can be rolled. The tubing at this stage should be within .010" of the finished O. D. for tubing around ¼" O. D. The scarfed seams should be slightly overlapping. Preferably the two seams should be opposite or 180° apart, but tubing having seams no closer than 90° has been found satisfactory. The completion of the formation of the tubing T with closely compacted plies and closely contracted seams as shown in Fig. 32, on Sheet 6, is effected by rotary swaging machine illustrated in Figs. 33, 34 and 35 on Sheet 6 and Figs. 77 to 82 on Sheet 9.

Figures 33, 35:
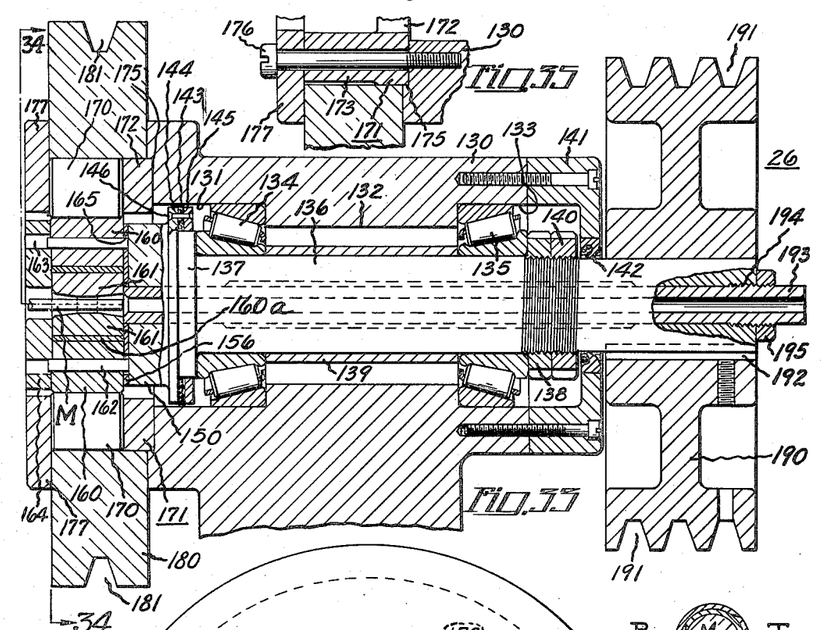
Fig. 33 is a longitudinal vertical sectional view through the rotary swager which forms the tubing into the form shown in Fig. 32, Fig. 33 being drawn to a smaller scale than Fig. 32.
Fig. 35 is a fragmentary sectional view on the line 35—35 of Fig. 34.

The rotary swaging machine comprises a frame 130 having a stepped or shouldered bore comprising portions 131, 132 and 133. The bores 131 and 133 receive tapered roller bearings 134 and 135 which support a tubular shaft 136 having a shoulder 137 against which the inner race of bearing 134 is urged by the tightening of a nut 138 which urges the inner race of bearing 135 against a spacer 139 which in turn bears against the inner race of bearing 134. Nut 138 which is threaded on shaft 136 is locked in position by locknut 140. The space to the right of nuts 138 and 140 and the bearing 135 is enclosed by a cup-shaped plate 141 which is attached to the frame 130 and which supports an oil or grease sealing ring 142 to prevent escape of lubricant toward the right along the shaft 136. Escape of lubricant to the left from the bearing 134 is minimized by a felt washer 143 secured between an annular flange 144 of the shaft 136 and a metal washer 145. The parts 145 and 143 are secured to the flange 144 by rivets 146.

Figures 34, 36:
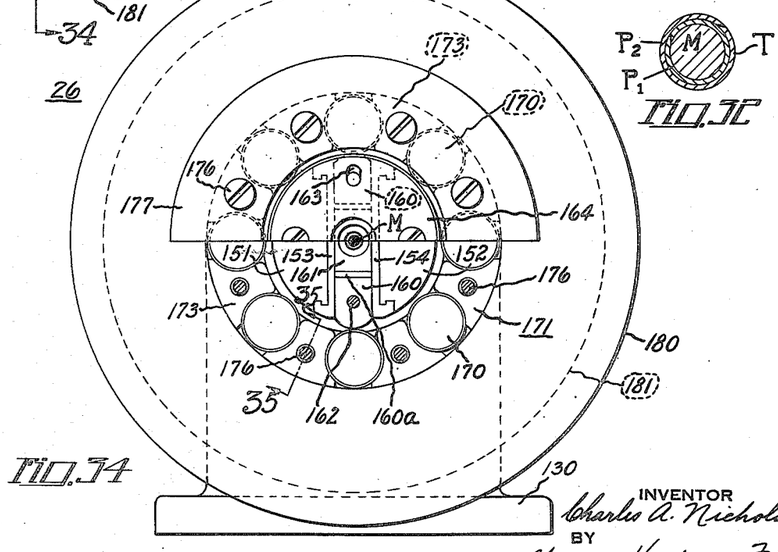
Fig. 34 is an end view partly in section of the swager, this view being taken along the line and in the direction of the arrows 34—34 of Fig. 33.
Figs. 36, 37 and 38 on Sheet 7 are side, top and left end views, respectively, of part $B_1$ of guide B on Fig. 1B on Sheet 2.
Figures 36, 37, 38, 39, 40, 41, 42, 43, 44, 45, 46, 47, 48:
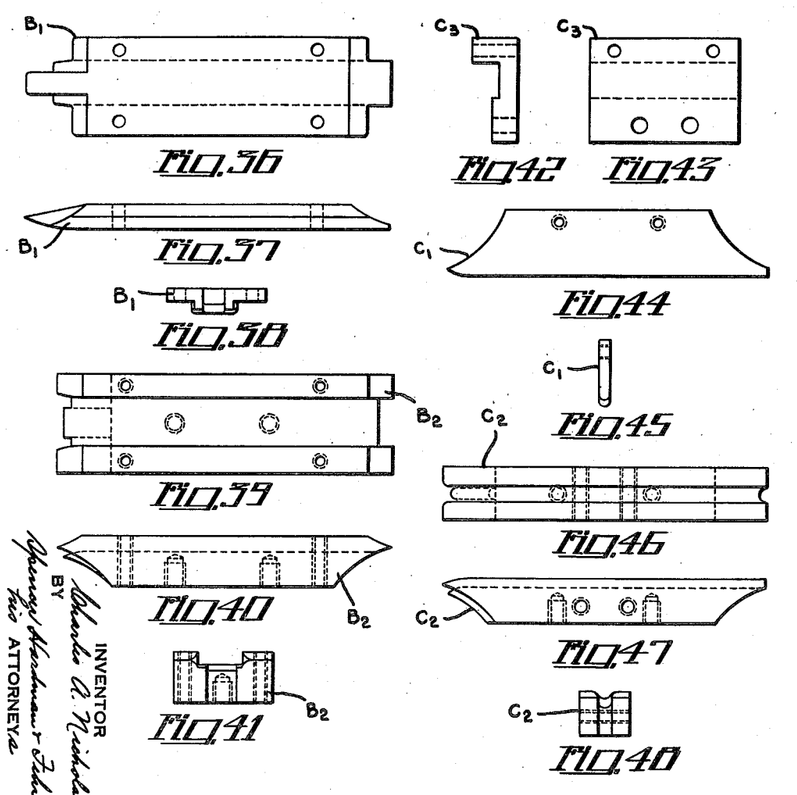
Figs. 39, 40 and 41 are side, top and end views, respectively, of part $B_2$ of guide B.
Figs. 42 and 43 are end and top views, respectively, of guide part $C_3$ of guide C on Fig. 1B.
Figs. 44 and 45 are plan and end views, respectively, of part $C_1$ of guide C.
Figs. 46, 47 and 48 are side, top and end views, respectively, of guide part $C_2$ of guide C.
Figures 70, 77, 79, 80:
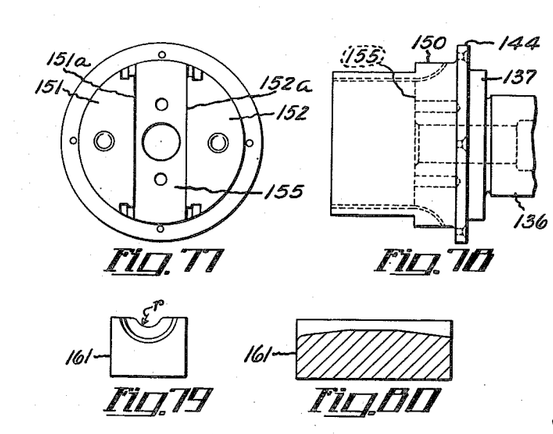

As shown also in Figs. 77 and 78 on Sheet 9, the shaft 136 has a head 150 from which extends two symmetrical bosses 151 and 152 which are similar segments of a cylinder. The surfaces 151a and 152a of these bosses receive hard metal liners 153 and 154, respectively, as shown in Fig. 34. The surface 155 of the head 150 located between the bosses 151 and 152 receives a hard metal liner 156 as shown in section in Fig. 33. These liners support and guide swaging hammers 160 which work against swaging dies 161, one of which is shown in detail in Figs. 79 and 80 which are drawn to about twice the scale of Figs. 33, 34, 35, 77, 78, 81 and 82. Each hammer 160 carries a pin 162, the ends of which project beyond the end surfaces of the hammers. As shown in Fig. 33, the left end of the pin 162 extends into a slot 163 in a plate 164 fastened to the bosses 151 and 152. The right hand end of the pin 162 extends into a slot 165 in the liner 156 formed and located similar to the slot 163. The pins 162 cooperate with plate 164 and liner 156 to limit outward movement of the hammers due to centrifugal force. When the tubing is passing through the swager the pins 162 do not bottom in the slots 163 and 165. The spaces between the hammers 160 and the dies 161 are occupied by one piece shims 160a of such thickness as to transmit the movement of the hammers to the dies to cause the dies to swage the tubing to the desired diameter.

Figures 81, 82:
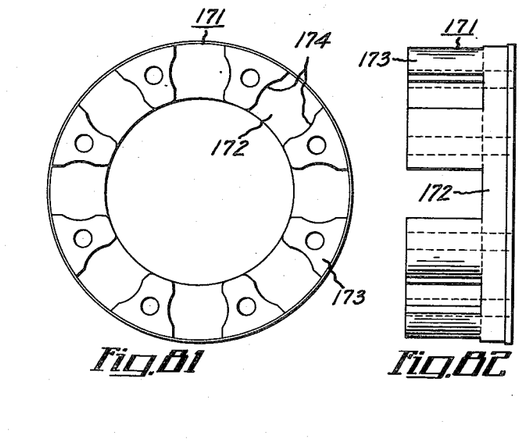
Figs. 81 and 82 are end and side views, respectively, of the roller cage of the rotary swager shown in Figs. 33 and 34.

As the shaft 136 rotates, the hammers 160 are caused to strike against rollers 170 supported by a stationary roller cage 171, details of which are shown in Figs. 81 and 82 on Sheet 9. The cage 171 comprises an annulus 172 from which extends a plurality of bosses 173 spaced apart so as to provide pockets 174 each for receiving a roller 170. As shown in Fig. 35, the annulus 172 of the cage 171 is received within a shouldered recess 175 in the frame 130 and is secured therein by screws 176 which also secure to the bosses 173 of the roller cage 171 an annular cover plate 177. The outer cylindrical surfaces of the annulus 172 and of the bosses 173 provide cylindrical bearing for a rotary disc 180 having a V-groove 181 for receiving a driving V-belt, not shown. The disc 180 is confined between the plate 177 and the opposite face of the frame 130.

The shaft 136 supports a driving pulley 190 having three V-groove 191 each for receiving a driving V-belt. Pulley 190 is fixed to the shaft 136 by key 192. Shaft 136 supports a guide tube 193 which is threaded into the shaft 136 as indicated at 194 and is locked in position by a locknut 195. This guide tube extends through the shaft 136 and terminates just short of the swaging dies 161.

The shaft 136 and the disc 180 are rotated in opposite directions and at speeds such that the peripheral speed of the inner cylindrical surface of the disc 180 is equal to the peripheral speed of the hammers 160 when striking the rollers 170.

The shaft 136 is rotated at a fairly high rate, namely 750 R. P. M. Due to centrifugal force, the hammers 160 and the dies 161 tend to move outwardly toward the rollers 170. When the hammers 160 strike the rollers 170 the dies 161 are directly behind them. Hence, the blow received by the hammers 160 striking the rollers 170 are directly transmitted through the shims 160a to the dies 161 causing them to pound against the tubing T to change its shape from that in Fig. 31, Sheet 5, to that shown in Fig. 32, Sheet 6. At the time the rollers 170 are struck by the hammers 161, the rollers are forced outwardly against the inner cylindrical surfaces of the disc 180 which is rotating in a direction opposite to the direction of rotation of the hammers 160. If, for example, the shaft 136 is rotating clockwise as viewed in Fig. 34, the upper hammer on striking the uppermost roller 170 will tend to cause the roller to move toward the right and be wedged against the adjacent boss 173 of the roller cage. This would tend to stop rotation of the roller 170, but this tendency is counteracted owing to the fact that the disc 180, which is rotating counterclockwise, tends to move the roller 170 toward the left. Thus any tendency of the hammer to bind the roller and to cause it to stop rotating is overcome by rotation of the disc 180. By the use of the rotating disc 180, the rollers 170 have a free turning action which is desirable in order to reduce friction and also to minimize the time of contact between the rollers and the hammer 160 thereby minimizing the time of contact between the dies 161 and the tubing. It is desirable that this time of contact be minimized, because the twisting or spiralling of the tubing which would result in spiral instead of longitudinal seams will be minimized. It will be remembered that the tubing is moving longitudinally at the rate of 18 ft. per minute (for ¼" O. D. tubing) while being acted upon by rotary swaging dies which do not move longitudinally with the tubing. Therefore, it is important that the blows delivered to the tubing be of as short duration as possible in order to minimize the spiralling of the tubing.

While tubing used for conducting liquids may be sufficiently strong although its seams have a certain amount of spiral, there are other uses of tubing which make it necessary that the seam be absolutely longitudinal. This is essential where the tubing is used for radio aerials mounted on the roofs of automobiles. Such tubing is generally chromium plated and highly polished; and, it is desirable that the longitudinal outer seam be as inconspicuous as possible. Hence, the tubing should have the outer seam absolutely longitudinal so that the tubing can be mounted with the seam down and therefore out of sight.

Another advantageous feature of the swaging machine is the guide tube 193 through which the work passes after leaving the swaging die 161. This guide tube eliminates most of the whipping of the work T and keeps it from being distorted and scarred. In order to adapt the swager to different sizes of tubing, the only changes that are required are in the swaging dies 161 and in the guide tube 193. For ¼" O. D. tubing the radius $r$ in Fig. 79 is .124". These blocks are 1½" long and the restricted portions at the center are ½" and the flares are each ½" long. The guide tube 193 will have the same outside diameter, but the inside diameter will vary to accommodate different sizes of tubing. The arbor M which passes through the swager is a continuation of the arbor M of the rolling mill and is .187" to .189" in diameter for a ¼" tube.

The swager finishes the tubing into the size shown in Fig. 32 with the plies closely compacted and the seams closely overlapping. The tubing then passes into the brazing furnace in which the temperature of the tubing is elevated to about 2100° F. and in which the tubing passes through a bath of copper which by capillary attraction almost instantly enters and fills the interstices between the seams and plies of the tubing. The excess copper is wiped off by a gas wiper or jet which envelopes the tubing as it passes from the brazing zone. Then the tubing passes through a cooler which is a water jacketed pipe containing a non-oxidizing atmosphere. The tubing is finally cooled by direct contact with water and rolled up into lengths of 1000 ft. The brazing apparatus is described and claimed in the copending application of Charles A. Nichols and Raymond H. Bish filed concurrently herewith.

Figs. 8, 9, 16, 17, 18, 23, 24, 29, 30 and 31 are drawn from actual microphotographs of cross sections of tubing at various stages of manufacture. As the tubing, after it leaves the rollers, springs outwardly due to some release of stress in the material, these drawings do not accurately show the condition of the work while it is between the rolls. However the drawings do show accurately the results of the various rolling operations. Fig. 32, which shows the result of the swaging operation is a fairly accurate cross-section of the work as it exists between the swaging dies.

While the embodiment of the present invention as herein disclosed, constitutes a preferred form, it is to be understood that other forms might be adopted, all coming within the scope of the claims which follow.

What is claimed is as follows:

1. Method of making multiply tubing from two plies of flat strip stock which comprises longitudinally moving the plies and, while the plies are longitudinally moving, causing the plies to be partially overlapped then causing the overlapped portions of the plies to be shaped cylindrically to form a portion of a plural-ply tube wall, and then causing the non-overlapping portions of the plies to be formed cylindrically to complete the tube wall.

2. Method of making multiply tubing from two plies of flat strip stock which comprises longitudinally moving the plies and, while the plies are longitudinally moving, causing the plies to be partially overlapped, then causing the overlapped portions of the plies to be shaped cylindrically to form a portion of a plural-ply tube wall, then causing the non-overlapping portions of the plies to be formed cylindrically to complete the tube wall, and finally compacting the plies together to perfect the cylindrical formation of the plies and for reducing the space between the plies and the seams.

3. Method of making double-ply tubing from two strips, comprising the steps of longitudinally overlapping the strips, fashioning the overlapped strip portions into substantially one half of the tube wall, shaping the remaining portion of the partial inner ply to complete the inner ply, and shaping the remaining portion of the partial outer ply around the inner ply.

4. Method of making double-ply tubing from two strips, comprising the steps of overlapping the strips, progressively rolling the overlapping portions of the strips to form substantially one-half tubular ply portions of the tubing, the tubing being passed through guides which engage the bent overlapping portions thereof tending to prevent lateral displacement of the plies, progressively rolling the non-overlapping portions of the inner ply about a mandrel located within the inner ply, and progressively rolling the non-overlapping portion of the outer ply about the inner ply.

5. Method of making double-ply tubing from two strips, comprising the steps of overlapping the strips, bending the remote side edges of the strips, passing the strips through a guide which engages the bent-up edges of the strips to prevent lateral shifting of the strips, progressively rolling the overlapping portions of the strips to form substantially one-half tubular ply portions of the tubing, progressively rolling the non-overlapping portion of the inner ply about a mandrel located within the inner ply, progressively rolling the non-overlapping portion of the outer ply about the inner ply, and in swaging said plies into compact relation about said mandrel.

6. Method of making double-ply tubing from flat ply strips, comprising the steps of overlapping the plies, forming the overlapped portions into approximate half-tubular shape, approximately comleting the tubular formation of the inner ply, approximately completing the tubular formation of the outer ply about the inner-ply and then perfecting the tubular formation of the plies and compacting the plies together.

7. Method of making double-ply tubing from flat ply strips, comprising the steps of moving the plies longitudinally in overlapped relation, progressively rolling the overlapped portions into approximate half-tubular shape, progressively rolling the non-overlapping portion of the inner ply to approximately complete the tubular formation of the inner ply, progressively rolling the non-overlapping portion of the outer ply to approximately complete the tubular formation of the outer ply and then perfecting the tubular formation of the plies and compacting the plies together.

8. In apparatus for making multiply tubing, the combination of means for moving two plies of flat strip stock longitudinally, means operating while the plies are moving longitudinally for causing the plies to be partially overlapped, means operable upon the longitudinally moving overlapped portions of the plies for causing said overlapped portions to be shaped cylindrically to form a portion of a plural-ply tube wall, and means operable thereafter upon the non-overlapping portions of the plies for causing them to be formed cylindrically to complete the tube wall.

9. In apparatus for making multiply tubing, the combination of means for moving two plies of flat strip stock longitudinally, means operating while the plies are moving longitudinally for causing the plies to be partially overlapped, means operable upon the longitudinally moving overlapped portions of the plies for causing said overlapped portions to be shaped cylindrically to form a portion of a plural-ply tube wall, and means operable thereafter upon the non-overlapping portions of the plies for causing them to be formed cylindrically to complete the tube wall and means for compacting the plies together for perfecting the cylindrical formation of the plies and for reducing the space between the plies and the seams.

10. In apparatus for making multiply tubing, the combination of means for forming strip stock into a multiply tube; a swager through which tube portions pass as they issue from the forming means, said swager including a mandrel suspended on the forming means and introduced into the partially formed tube therein and extending through the swager, and reciprocating dies to compact the tube against the mandrel; and means for lubricating that part of the strip stock which is to form the inner wall of the tube to reduce friction between the tube and mandrel.

11. In apparatus for making multiply tubing, the combination of means for forming longitudinally moving strip stock into multiply tubing; and a swager comprising a rotatable head provided by a tubular shaft through which the tubing passes as it issues from the forming means, radially movable swaging dies carried by the head and engageable with the tubing, a plurality of rollers arranged in a circular row around said head, a stationary cage confining said rollers, radially movable hammers carried by said head and engageable with said rollers to receive blows therefrom delivered by the hammers to the dies, a roller outer-race member mounted for rotation, and means for rotating the tubular shaft and outer-race member in opposite directions and at speeds such that the linear speed at which a hammer strikes a roller equals the linear speed of the roller engaging surface of the outer race, whereby the time of contact of the rotating dies with the longitudinally moving tubing is minimized.

12. Apparatus according to claim 11 in which the roller cage provides a bearing for the outer race.

13. In apparatus for making two-ply tubing from a plurality of strips, the combination with cooperating rolls for forming two longitudinally, partially overlapped flat strips into a multiply tube, of a guide for directing the strips to the rolls in overlapped relation, said guide comprising a center plate, grooved plates, one located against each side of the center plate, means for adjusting the grooved plates along the center plate, and means for clamping the grooved plates to the center plate in the desired position of adjustment.

14. In apparatus for making double-ply tubing from two strips, the combination of cooperating rolls for forming longitudinally overlapped strip portions into substantially one-half of the tube wall; cooperating rolls for forming the remaining portion of the partial inner ply to cause the inner ply to take a tubular form; and other cooperating rolls for forming the remaining portion of the partial outer ply around the inner ply to cause the outer ply to take a tubular form.

15. In apparatus for making double-ply tubing from two strips, a guide for causing the strips to be overlapping, a pair of rolls for bending the remote edges of the strips in the same direction, a second guide for engaging said bent-up edges to guide the work while preventing lateral displacement of the strips, pairs of rolls for progressively bending the overlapping portions of the strips to form substantially one-half tubular ply portions, pairs of rolls for progressively bending the non-overlapping portion of the inner ply to cause it to take a tubular form, and pairs of rolls for progressively bending the non-overlapping portion of the outer ply about the inner ply.

16. In apparatus for making double-ply tubing from two strips, the combination of cooperating pairs of rolls for progressively forming overlapped strip portions into substantially half tubular ply portions, guides between said pairs of forming rolls and engaging the overlapping ply portions at the bend thereof tending to prevent lateral displacement thereof, pairs of rolls for progressively bending the non-overlapping portion of the inner ply to cause it to take a tubular form, and pairs of rolls for progressively bending the non-overlapping portion of the outer ply about the inner ply.

17. In apparatus for making double-ply tubing from two strips, the combination of cooperating pairs of rolls for progressively forming overlapped strip portions into substantially half tubular ply portions, a forming mandrel located in engagement with the inner ply portion, pairs of rolls for progressively bending the non-overlapping portions of the inner ply around said mandrel to cause the inner ply to take a tubular form, and pairs of rolls for progressively bending the non-overlapping portion of the outer ply around the inner ply.

18. In apparatus for making double-ply tubing from two strips, the combination of cooperating pairs of rolls for progressively forming overlapped strip portions into substantially half tubular ply portions, a forming mandrel located in engagement with the inner ply portion, pairs of rolls for progressively bending the non-overlapping portions of the inner ply around said mandrel to cause the inner ply to take a tubular form, pairs of rolls for progressively bending the non-overlapping portion of the outer ply around the inner ply and a swager into which said mandrel extends and having means for compacting said plies about said mandrel and perfecting the tubular formation thereof.

CHARLES A. NICHOLS.